United States Patent [19]

Chase et al.

[11] Patent Number: 5,029,469

[45] Date of Patent: Jul. 9, 1991

[54] SHEET TENSION SENSOR

[75] Inventors: Lee M. Chase, Los Gatos; Leonard M. Anderson, San Jose; Mathew G. Boissevain, Los Altos; John D. Goss, San Jose, all of Calif.

[73] Assignee: Measurex Corporation, Cupertino, Calif.

[21] Appl. No.: 247,177

[22] Filed: Sep. 21, 1988

Related U.S. Application Data

[63] Continuation-in-part of Ser. No. 208,259, Jun. 17, 1988, abandoned.

[51] Int. Cl.$^5$ ............................................... G01L 5/04
[52] U.S. Cl. .................................................... 73/159
[58] Field of Search ........... 73/862.38, 862.39, 862.45, 73/862.46, 862.47, 862.48, 788, 849, 852, 159; 162/198, 263

[56] References Cited

U.S. PATENT DOCUMENTS

| | | | |
|---|---|---|---|
| 2,444,245 | 6/1948 | Campbell | 73/862.45 |
| 3,677,076 | 7/1972 | Herzhoff et al. | 73/862.45 |
| 3,718,037 | 2/1973 | Stringer et al. | 73/862.45 |
| 4,107,847 | 8/1978 | Typpo et al. | 33/143 L |
| 4,453,404 | 6/1984 | Powell et al. | 73/159 |
| 4,587,855 | 5/1986 | Yamada et al. | 73/862.48 |

Primary Examiner—Robert Raevis
Attorney, Agent, or Firm—Spensley, Horn, Jubas & Lubitz

[57] ABSTRACT

A sheet tension measuring device is disclosed for measuring the tension of a moving sheet wherein a moving sheet is accurately positioned with pinchers at 2 spaced locations. The sheet is deflected between these pinchers from its nominal straight line path, and the amount of deflection and deflecting force are measured. The pinchers iron out any wrinkles in the sheet as the moving sheet slides through the pinchers. Sheet tension is computed based upon the measured deflection force and deflection distance. The resulting measurements of local sheet tension are used to correct nondestructive sheet strength measurements. A device and method are also disclosed for nondestructively determining the sheet strength and the extensional stiffness of the sheet in the machine direction and in the cross-direction.

15 Claims, 6 Drawing Sheets

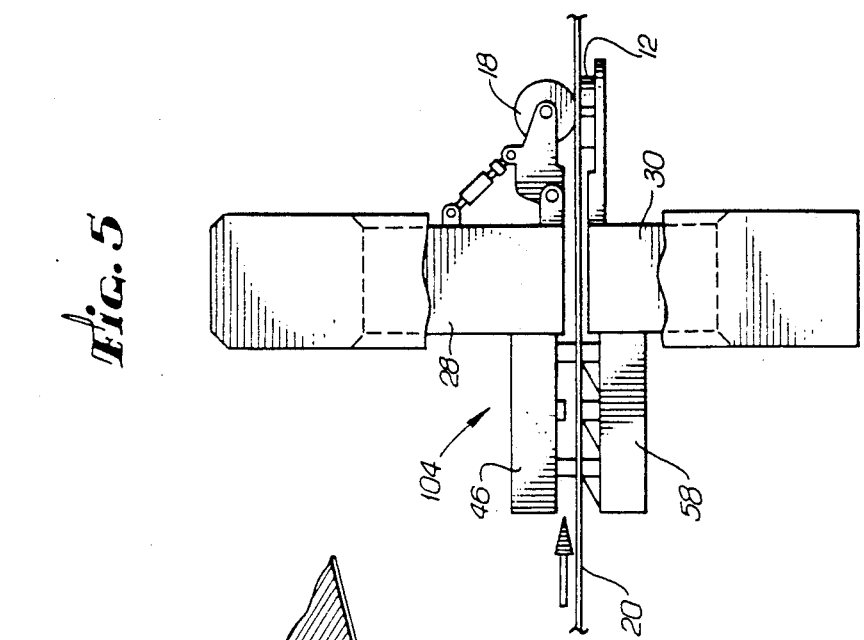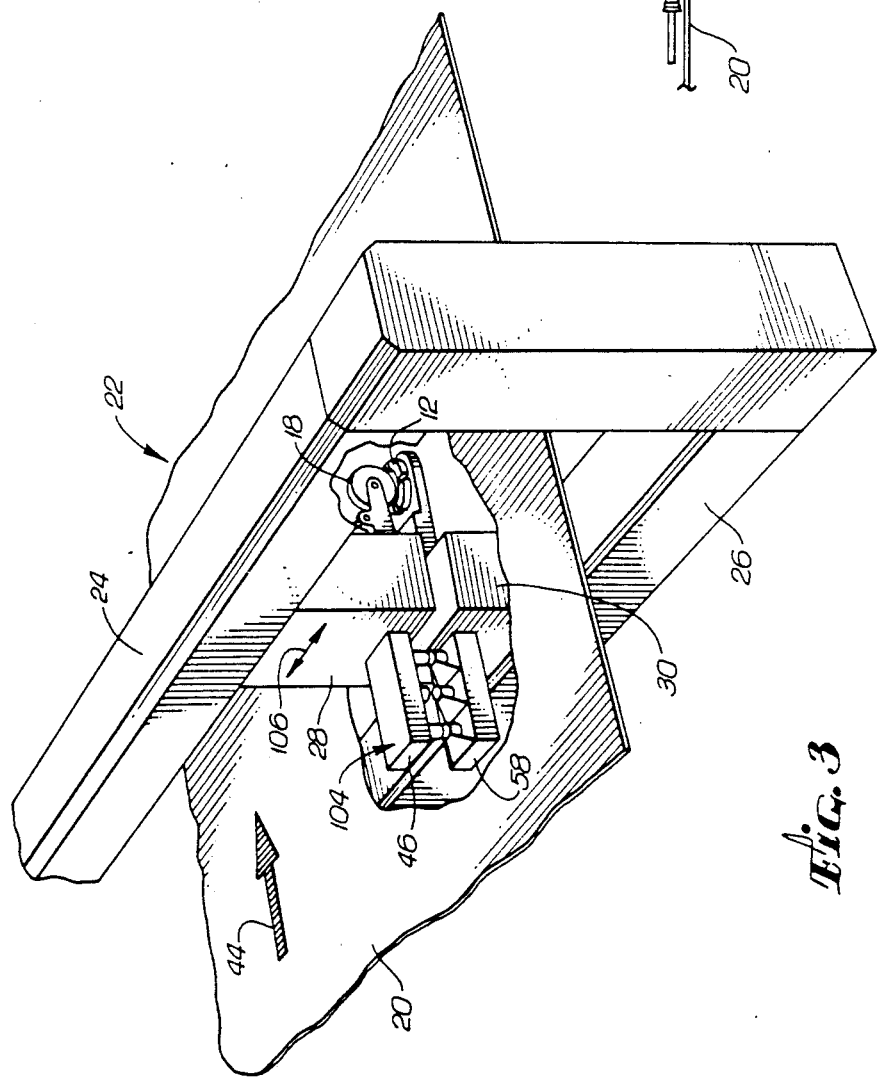

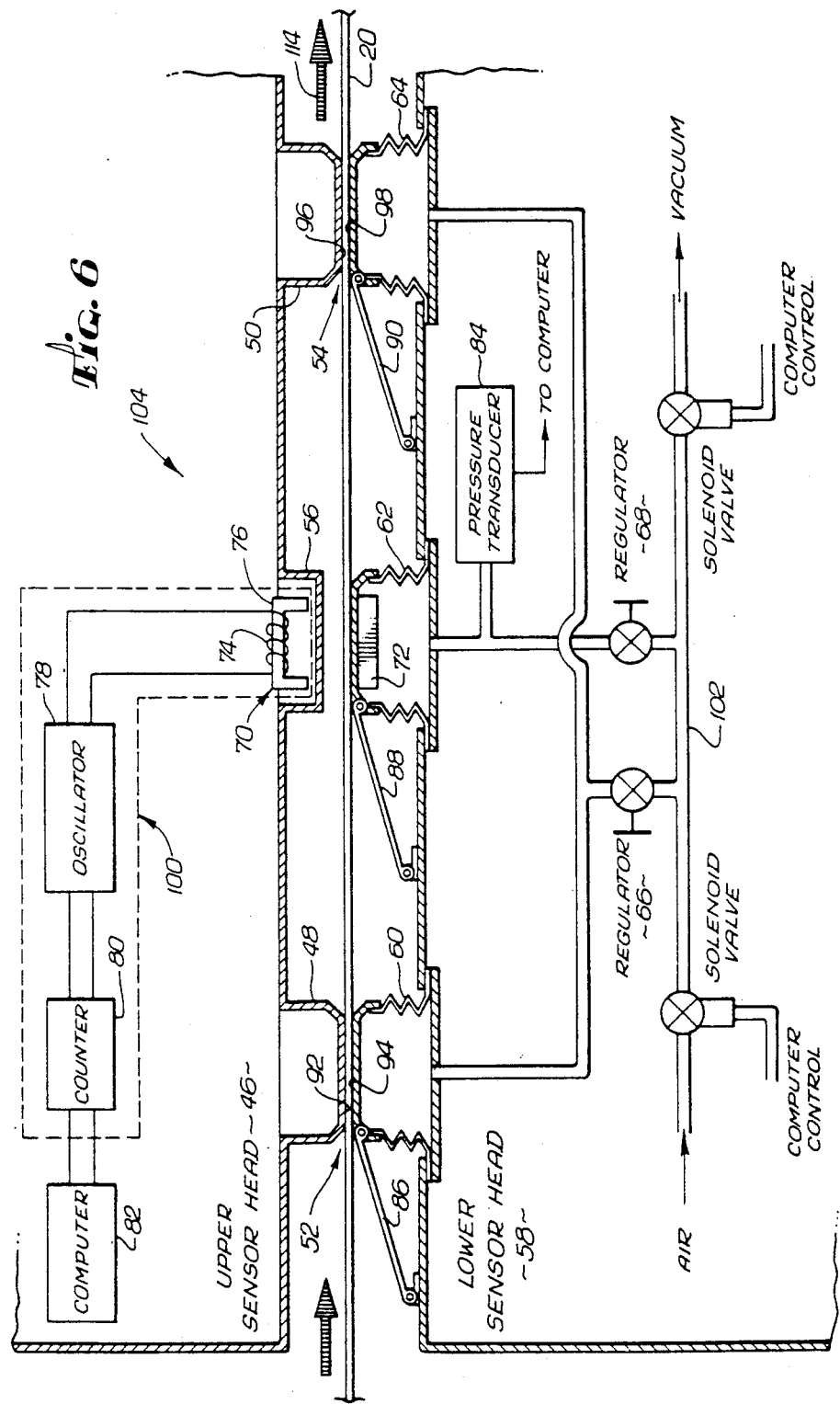

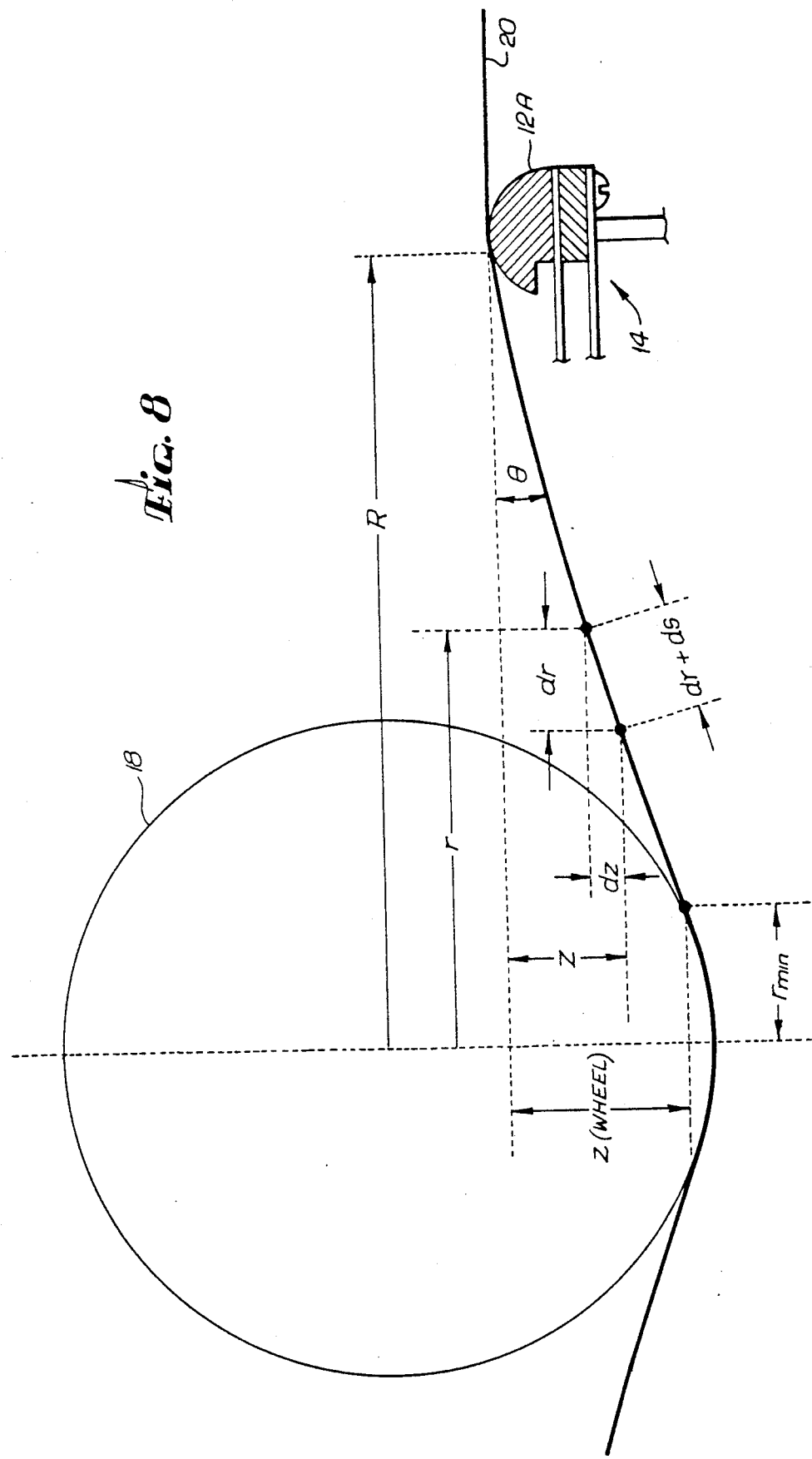

SHEET TENSION SENSOR

This is a continuation-in-part of copending U.S. patent application Ser. No. 07/208,259, filed June 17, 1988, now abandoned.

BACKGROUND OF THE INVENTION

The present invention relates to the accurate measurement of sheet tension, and more particularly to the measurement of the tension experienced by a moving sheet at relatively small, localized portions of the entire sheet which is held under tension. Even more particularly, the present invention relates to the use of localized sheet tension measurements in the nondestructive determination of sheet strength. The present invention also relates to the non-destructive determination of the extensional stiffness of the sheet.

It is desirable to measure the tension of a moving sheet in a number of industrial sheet manufacturing and processing situations. A number of sheet tension measuring devices are disclosed in the art. With certain of these devices, the sheet is forcibly deflected from a straight path of travel between various parts of the sheet processing equipment. The force required to deflect the sheet and the amount of deflection are measured. A geometrical calculation is then performed to compute sheet tension, based upon the known deflection and applied deflecting force.

Although useful, there is a need for improvement of the above-mentioned sheet tension measuring devices. For example, to the best of applicants' knowledge, none of these devices securely hold the moving sheet to the surface of the sheet processing equipment at the points where the sheet is bent during the deflection. Thus, under certain situations, the sheet may tend to fly around somewhat and lift off of the surface of the equipment. This is particularly true when the sheet is moving at high speed, as would occur, for example, in modern paper mills. Moreover, wrinkles in the sheet will also tend to raise the sheet off of the surface of the equipment at the bending points. Thus, the deflection geometry may not be accurately known, and error is therefore introduced into the tension calculation.

Copending, commonly assigned U.S. patent application Ser. Nos. 730,406, filed May 2, 1985, 056,332, filed May 26, 1987, 195,364, filed May 13, 1988, 220,415, filed July 18, 1988, and 146,930, filed Jan. 22, 1988, each of which is incorporated herein by reference, disclose various devices and methods for nondestructively measuring the strength of moving sheet materials, particularly paper. As used herein, the term "strength" means the strength of the sheet at failure, and includes reference to such sheet strength parameters as the tensile strength, which is conventionally measured at the point where the sheet tears and also includes the well known "Mullen" sheet strength value which has conventionally been determined by a destructive sheet bursting test.

The major factors which influence the strength of, for example, paper sheet, are the basis weight of the sheet (i.e., the weight of the sheet per unit surface area) and the sheet thickness. These factors also effect the extensional stiffness of the sheet (i.e., the resistance of the sheet to being stretched). A nondestructive sheet strength sensor is disclosed in the cross-referenced patent applications, and one embodiment of this strength sensor is illustrated in the cross-sectional view of FIG. 1. By sensing a physical characteristic of the sheet related to extensional stiffness, this strength sensor 108 can be used to determine sheet strength.

The sheet strength sensor 108 of FIG. 1 uses a sheet support ring 12 which is split into 4 segments 12A-12D, each occupying approximately 90° of the ring circle. A top view of this segmented ring 12 is illustrated in FIG. 2. Each segment 12A, 12B, 12C and 12D is supported on a pair of leaf springs 14. The freely rotatable wheel 18 forcibly deflects the moving sheet 20 into the center of the ring 12. It is preferred that the periphery of the wheel 18 be spherically convex rather than cylindrical. Each load cell 16A-16D senses the downward force of the moving sheet 20 on the corresponding supported ring segment 12A-12D, respectively. Since the wheel 12 bends the sheet 20 into the center of the ring 12, the output signal from each of the load cells 16A-D is dependent, in part, on the bending resistance of the sheet 20. Moreover, the portion of the sheet 20 passing under the wheel 18 must travel a greater distance than the sheet 20 which travels in a straight line outside of the ring 12. Thus, the sheet 20 is stretched by the wheel 18 and the loads sensed by load cells 16A-D are, therefore, also affected by the extensional stiffness of the sheet. As previously mentioned, the extensional stiffness can be related to sheet strength.

The 4 ring segments are aligned so that 2 segments 12A and 12C, are disposed on opposite sides of the ring 12 on a line oriented in the direction of travel of the sheet 20, as shown in FIG. 2. The orientations in both directions along the length of this line are known as the "machine directions". These "machine direction" ring segments are sensitive to the machine direction characteristics of the sheet 20. The remaining two ring segments, 12B and 12D, are sensitive to the "cross-direction" characteristics of the sheet 20. The "cross-directions" are perpendicular to the machine directions in the plane of the sheet. A computer (not shown in FIGS. 1-2) accepts the output signals of each of the 4 load cells 16A-D coupled to the ring segments 12A-D and calculates sheet strength using these signals in accordance with certain empirical equations which have been developed and are discussed below.

The process for making paper involves laying a wet mass of wood pulp fibers onto a moving porous belt, drying the mass, and finally calendaring the resulting paper sheet to give it the desired surface finish and thickness. The sheet strength sensor 108 is most advantageously used to monitor the strength of paper sheet after the final calendaring step, and before the paper is rolled-up on the final reel at the end of the manufacturing process. Since the strength of the paper produced may vary across the width of the sheet 20 as well as along the length of the sheet 20, the strength sensor 108 is preferably mounted on a scanning system, whereby the strength sensor 108 is scanned back and forth across the width of the sheet 20 in the cross directions while the sheet 20 is being fed out of the calendar and onto the final reel. In this way, the variations in sheet strength along the cross direction may be determined, as well as the strength of the paper sheet at each section along its length in the machine direction.

FIG. 3 illustrates a scanning system 22, which, as noted above, is preferably located after the final calendar rolls and before the final reel. In this figure, the sheet of paper 20 can be seen passing through the scanning station 22 in the direction of arrow 44 between two transverse beams 24 and 26. Upper and lower gauge support members, 28 and 30, are mounted to the upper 24 and lower 26 beams, respectively. The paper 20 sheet is shown in FIG. 3 with a cut out area so that the relationship between the gauge support members, 28 and 30, can be seen. A motor (not shown) within the scanning system 22 is coupled to and drives the gauge support members, 28 and 30, back and forth, in the cross directions in a continuous scanning motion, keeping the gauge support members, 28 and 30, in vertical alignment at all times.

As previously mentioned, the force exerted on each of the segments of the sheet supporting ring, 12A-12D, is a function of the extensional stiffness of the sheet 20 and the bending resistance of the sheet 20. The tension applied to the sheet 20 by the sheet processing equipment also affects the force on the ring segments 12A-12B. The extensional stiffness and the bending resistance of the sheet 20 may be different in the machine directions as compared to the cross directions, so that the force applied to load cells 16A and 16C is not necessarily the same as the force applied to load cells 16B and 16D. The difference in tension between the machine directions and cross directions also results in a different force sensed by load cells 16A and 16C as compared to load cells 16B and 16D. In the usual situation, as illustrated in FIG. 3, the sheet processing equipment provides tension only along the machine direction, to thereby cause the sheet 20 to move through the sheet processing equipment.

By properly combining the outputs of load cells 16A-16D, it is possible to make a nondestructive measurement of sheet strength on-line which accurately correlates with a wide variety of standard destructive sheet strength laboratory tests. For example, on-line measurements can be made of paper sheet which accurately correlates with conventional destructive laboratory tensile strength tests. To make such on-line measurements, the outputs of load cells 16A and 16C are fed to a computer along with the output of a displacement sensor 32 (FIG. 1) and a sheet tension measuring device 34 (FIG. 4). The displacement sensor 32 may be any one of a variety of known sensors, such as an eddy current device, which uses magnetic fields to determine the position of the wheel and hence the amount of deflection, Z, of the sheet. The sheet deflection value, Z, is used in the sheet strength equations discussed below.

There are also ways known in the art for measuring the tension in the sheet 20. One such device for measuring overall sheet tension is shown in cross section in FIG. 4. As shown in this figure, the sheet 20 is threaded around 3 rollers 36, 38 and 40, each of which extends across the entire width of the sheet 20. The rollers 36 and 38 are fixed relative to the paper-making machine and roller 40 is restrained from moving in a vertical direction by force transducer 42. The output of this force transducer 42 is a function of the average sheet tension and can be used to provide the sheet tension quantity, T, in the following equations.

Utilizing the equation for machine direction tensile strength disclosed in U.S. patent application Ser. No. 220,415, for example, the computer determines machine direction tensile strength, as follows:

$$S_{md} = A\left[\frac{(L_a + L_c)}{(B + Z)(C + T)}\right]^D + E. \quad (1)$$

where
- $S_{md}$ is the machine direction tensile strength of the paper sheet 20;
- A, B, C, D and E are constants;
- $L_a$ and $L_c$ are the values of the output signals from the machine direction load cells, 16A and 16C, respectively, indicative of the downward force sensed by these load cells;
- T is a value representative of the average tension across the entire width of the sheet 20, as determined by the sheet tension measuring device 34; and Z is the output of the displacement sensor 32 indicative of the distance the sheet 20 is deflected into the ring 12.

The constants A-E may be determined using conventional curve fitting techniques by correlating the results of conventional laboratory machine direction tensile strength tests with the value of $S_{md}$.

The cross-directional tensile strength may be similarly calculated utilizing the following equation:

$$S_{cd} = F\left[\frac{(L_b - L_d)}{(G - Z)(H + T)}\right]^I + J \quad (2)$$

where
- $S_{cd}$ is the cross-directional tensile strength of the paper sheet 20;
- F, G, H, I and J are constants;
- $L_b$ and $L_d$ are the values of the output signals from the cross direction load sensors, 16B and 16D, respectively, indicative of the downward force sensed by these load cells; and
- T and Z are the same as discussed above in connection with equation (1). The constants F-J may be similarly calculated through conventional curve fitting techniques.

Although the sheet tension measurement provided by the device of FIG. 4 provides a useful correction to the sheet strength measurement in cases wherein the overall sheet tension varies because of changes in the machine direction tension applied to the sheet by the sheet processing equipment, the device nevertheless measures tension across the entire sheet, and therefore may not provide readings representative of variations in the sheet tension being experienced by the relatively small portion of the sheet deflected by the wheel 18 of the strength sensor 108 at any particular instant. For example, it has been found that machine directionally oriented sheet tension can vary from point to point along the cross direction due to sheet edge effects. The reason for this variation is not completely understood. However, in papermaking, this difference in tension is thought to occur during the process of drying the sheet 20. During drying, the sheet fibers tend to shrink. Toward the middle of the sheet 20, the shrinkage is restrained by the surrounding fibrous material. This induces a tension in the fibers. However, there is less restraint at the sheet edges since there are fewer surrounding fibers. Here, the shrinkage is relatively unrestrained and, therefore, sheet tension is relieved near the edges of the sheet. As a result, machine directionally oriented sheet tension is, at least in certain instances, variable across the width of the sheet (i.e., in the cross-direction). Therefore, to provide the most accurate strength measurements at different positions across the width of the sheet, the sheet tension should be measured at different locations across the width of the sheet 20, and tension measurements from these different locations used in the sheet strength equations.

SUMMARY OF THE INVENTION

The present invention provides a device and method for precisely measuring the tension of a moving sheet material, such as paper sheet being manufactured on a papermaking machine. The invention will be described with respect to paper sheet tension measurements on a papermaking machine. However, it is to be understood that the invention may also be used to measure the tension of other sheet materials.

According to the present invention, as the paper moves along the machine, it passes through 2 sheet pinching devices ("pinchers") which are spaced from each other at a known fixed distance along the machine direction. These pinchers hold the sheet at exactly known vertical positions, but allow the sheet to slide therethrough laterally with negligible friction. In this way, the tension on the moving sheet is essentially uneffected by the pinchers.

A deflecting device applies a known force to the moving sheet at a location between the sheet pinchers, and thereby deflects the sheet out of the straight-line path of travel between the pinchers. The amount of deflection is measured, and the sheet tension computed based on known geometrical principles, the known deflection force, the known distance that the sheet is deflected from its straight-line path and the distance between the pinchers and deflecting device. Because the sheet is held between pinchers, the sheet cannot flop around where it is restrained by such pinchers, and any wrinkles in the sheet are also "ironed out" by the pinchers as the sheet passes therethrough. Thus, the geometry of the deflected portion of the sheet is well defined, and the tension sensor of the present invention is therefore capable of extremely accurate tension measurements.

In the previously described paper strength sensor of FIGS. 1–2, the measured force of the sheet pressing against the various ring segments, 12D–12D, is the result of 3 additive factors: (1) the sheet bending resistance; (2) the strain induced in the sheet as a result of being deflected by the wheel into the center of the ring, i.e., the extensional stiffness of the sheet; and (3) the tension applied to the sheet by the sheet processing equipment. As previously mentioned, it is the extensional stiffness of the sheet which can be related to sheet strength.

Ideally, the machine-directionally oriented sheet tension is held constant at all times and uniform across the width of the sheet. If this can be accomplished, then the effect of sheet tension can be simply accounted for in the values of the constants of the sheet strength equations. The sheet bending resistance is usually negligible, and can therefore usually be ignored. However, the sheet processing equipment does not always apply a constant, uniform tension to the sheet. Instead, it may apply different tensions at different times. Moreover, as previously mentioned, the machine-directionally oriented tension applied to the sheet by the processing equipment also is frequently not uniform across the width (i.e., the cross direction) of the sheet. Accordingly, the applicants have recognized that to achieve an even more accurate calculation of sheet strength, the sheet tension should be measured as a function of the cross-directional position of the strength sensor, and the component of this tension which is sensed as a downward force by the load cells of the strength sensor subtracted from the overall force measured by each of the load cells. Thus with the effect of sheet tension subtracted from the forces measured by the load cells of the segmented ring, and the effects of bending stiffness being negligible, the resulting force values are indicative only of the force required to stretch the sheet into the ring center. As previously mentioned, this is the extensional stiffness of the sheet and can be related to sheet strength.

In certain instances, it may be desirable to also subtract the effect of the sheet bending resistance from the forces measured by the strength sensor load cells. The bending resistance can be determined simply by placing an unrestrained sheet on the ring 12 and depressing it with the wheel 18 into the ring center. Since such a sheet is not under tension, the only force measured by the load cells results from the resistance of the sheet to bending. Applicants have found that for a wide variety of paper sheets this bending resistance typically accounts for less than 1% of the measured force on the ring segments. However, if desired, the force on the load cells resulting from the bending resistance can also be subtracted from the load values, $L_a$–$L_d$, used in the strength equations.

To measure machine-directionally oriented sheet tension at various cross-directional locations across the width of the sheet, the sheet tension sensor of the present invention is supported from the gauge support members of the scanner such that the strength sensor and tension sensor are disposed in-line with each other along the machine direction. In this way, the tension sensor always measures the machine-directionally oriented tension on the portion of the sheet then being deflected by the wheel of the strength sensor.

For use in nondestructively computing sheet strength, the computer receives signals from the tension sensor indicative of the force used to deflect the sheet in the tension sensor and the amount of the resulting deflection. From these two values and the known dimensions of the tension sensor, the computer can determine the local machine-directionally oriented sheet tension. The computed local sheet tension is then combined by the computer with values from the load cells and displacement sensor of the sheet strength sensor, and used in the calculation of the sheet strength.

In certain situations, it may be desired to determine the extensional stiffness of the sheet, rather than, or in addition to, determining sheer strength. In this case, the computer may be programmed to compute extensional stiffness based upon the previously determined local machine-directionally oriented sheet tension values, the load values measured by the load cells of the strength sensor, the amount of sheet deflection, Z, as determined by the displacement sensor, and the sheet thickness. Sheet thickness (also known as "sheet-caliper") may be readily determined using a well known sheet caliper device.

Finally, it has been determined that the failure strength of paper sheet is directly proportional to the extensional stiffness of the sheet. Accordingly, once the extensional stiffness is determined with the device and method of the invention, the sheet failure strength can also be easily calculated.

DESCRIPTION OF THE DRAWINGS

FIG. 3 is a perspective view of the strength sensor of FIG. 1 and an embodiment of the sheet tension sensor of the present invention shown mounted to the gauge support members of a scanning system for scanning, back and forth, across the width (i.e., cross direction) of a moving sheet material.

FIG. 5 is a partially broken away side view of the apparatus of FIG. 3.

FIG. 6 is a more detailed partially schematic cross-sectional view of the tension sensor illustrated in FIGS. 3 and 5.

FIG. 8 is a diagrammatic, exaggerated, cross-sectional representation of the sheet being deflected by the wheel of the strength sensor.

DETAILED DESCRIPTION OF THE PREFERRED EMBODIMENTS

Figure 1:
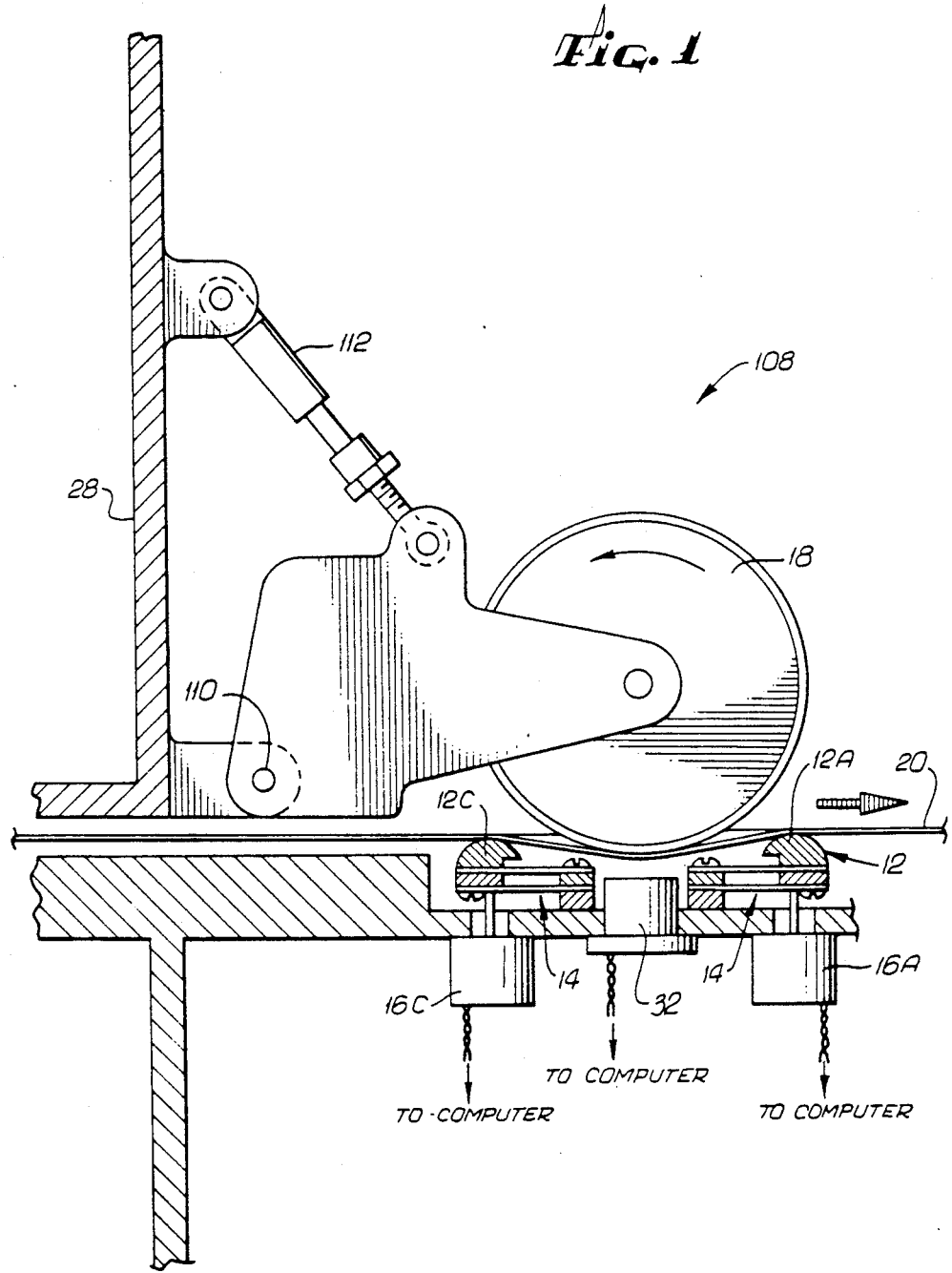
FIG. 1 is a cross-sectional view of a nondestructive sheet strength sensor.
Figure 2:
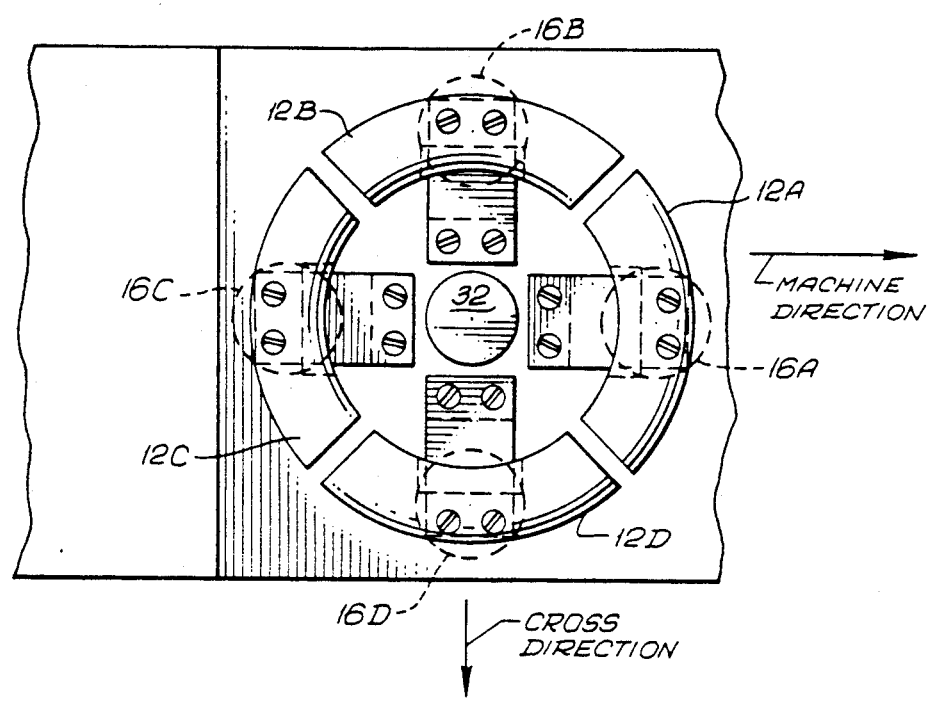
FIG. 2 is a top view of the segmented sheet supporting ring which is illustrated in cross-section in FIG. 1.
Figure 4:
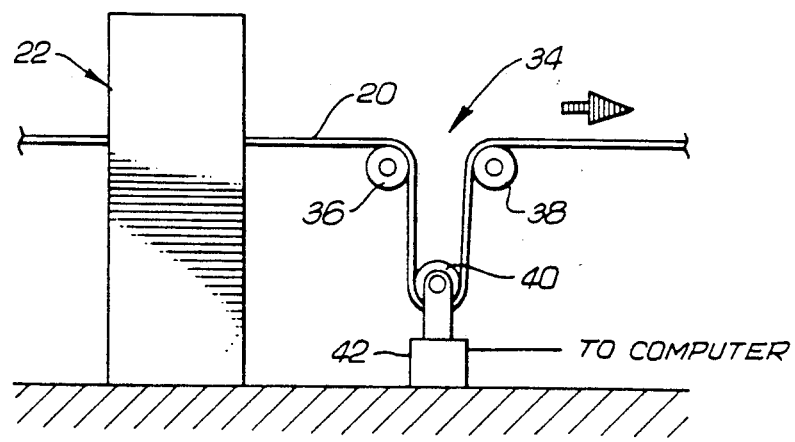
FIG. 4 is a cross-sectional view or a tension measuring device for measuring the overall machine direction tension across the entire width of the sheet.

FIG. 6 illustrates the various components of a presently preferred embodiment of the sheet tension sensor 104 of the present invention. This tension sensor 104 may be viewed as being comprised of upper and lower sections. The upper section is shown disposed above the moving sheet 20 (moving in the direction of arrow 114). The lower section is shown disposed beneath the sheet 20. However, the device would work equally well in other orientations, for example, where the "upper" section is positioned below the sheet 20 and the "lower" section is disposed above the sheet 20.

The upper section is mounted to the upper gauge support member 28 of the scanner 22, as illustrated in FIGS. 3 and 5. The upper section consists of a rigid molded upper head 46 which includes 2 posts, 48, 50, each forming half of the anterior and posterior sheet pinchers, 52, 54, respectively. The flat sheet-contacting surfaces of the posts, 48, 50, fix the vertical position of the sheet 20, and therefore serve as reference points with which to accurately measure sheet deflection. In the illustrated presently preferred embodiment, each post 48, 50 is cylindrical and has a 1 inch diameter. The posts 48, 50 are preferably spaced 5 inches apart, as measured from the closest points of their cylindrical surfaces. The posts 48, 50 preferably extend about 1 inch below the upper head 46.

The upper head 46 further includes a central plateau 56, which is also cylindrical and which is likewise preferably 1 inch in diameter. The plateau 56 extends downward from the upper head 46, but to a lesser extent than the posts 48, 50. Preferably, the plateau 56 protrudes from the upper head 46 by about ½ inch.

The lower tension sensing section includes a lower sensor head 58 and 3 bellows, 60, 62 and 64, mounted to and protruding above the lower head 58. Each bellow is disposed below the sheet 20 and opposes either a post, 48, 50 or the plateau, 56 as best illustrated in FIG. 6. Bellows 60 and 64 form the lower half of pinchers 52 and 54, respectively. A sheet-guiding channel is formed between the flat upper surfaces of bellows 60 and 64, and the opposing surfaces of posts 48 and 50, respectively.

Each of the bellows is operated by an air and vacuum supply. Pressure regulator 66 controls the supply of air to inflate bellows 60 and 64. When inflated, bellows 60 and 64 securely hold the sheet 20 against the posts, 48, 50, while still allowing the sheet 20 to slide laterally through the tension sensor 104. The sheet contacting surfaces of the posts 48, 50 and the anterior and posterior bellows, 60, 64, are coated with a hard, abrasion resistant material, such as sapphire, to resist wear caused by contact with the moving sheet 20.

Regulator 68 controls the air pressure to bellow 62. This bellow, when inflated, expands and presses against and deflects the sheet 20 toward the plateau 56. The object is to measure the machine directionally oriented tension which each cross-directional slice of the sheet is experiencing as a result of being drawn through the sheet processing equipment. Therefore, bellow 62 should be inflated to the minimal extent necessary to obtain a useful reading. Over-inflation of the bellow 62 will stretch the sheet 20, thereby inducing additional tension in the deflected sheet portion, and thus produce a falsely large tension reading. Preferably, the bellow 62 pressure is adjusted to deflect the sheet less than about 2 millimeters. Applicants have found that, with a 2 mm deflection, 80% of the measured tension is due to the force applied to the sheet by the sheet processing equipment as it pulls the sheet through the processing equipment Conversely, with a 2 mm deflection, 20% of the measured tension is induced in the sheet as a result of the tension sensor 104 stretching the sheet 20. It is, therefore, especially preferred to deflect the sheet between 1.0 mm and 1.5 mm toward the plateau 58 from its nominal straight line path between the pinchers With this amount of deflection, 95% of the measured tension is truly reflective to the tension caused by the sheet processing machinery pulling the sheet forward in the machine direction, while only 5% is tension induced in the sheet by the stretching effect of the tension sensor 104 itself. Of course, this smaller deflection therefore produces a more accurate sheet tension measurement. The bellow 62 should not, of course, be inflated so far as to force the sheet into contact with the plateau 52, since the deflection forces would then no longer be uniquely correlated with particular amounts of sheet tension. The sheet contacting surface of bellow 62 is also coated with sapphire or other hard, smooth abrasion resistant material.

The tension sensor 104 is also equipped with a well known electro-magnetic proximity sensing device 100 for accurately measuring the sheet deflection. This device 100 includes an electro-magnet 70 disposed within the plateau 56 and a piece of ferrite material 72 mounted within the bellow 62 adjacent to the sheet contacting surface. As is known in the art, the coil 74 surrounding the core 76 of the electro-magnet 70 is electrically connected to an oscillator circuit 78 and used as the inductance of that circuit. Thus, movement of the ferrite material 72 in the bellow 62 toward and away from the coil 74 during sheet deflection changes the inductance of the coil 74 and hence the resonant frequency of the oscillator circuit 78.

A frequency counter 80 is operatively coupled to the oscillator 78 to determine its resonant frequency. The counter then sends a signal to the computer 82 indicative of this resonant frequency. The computer 82 computes the distance between the electro-magnet 70 and the deflected portion of the sheet 20 based upon this resonant frequency. Simultaneously, pressure tranducer 84 provides the computer 82 with a signal indicative of the force applied to the sheet 20 during the deflection. Since the computer 82 is provided with force and deflection values, and since the geometry of the tension sensor 104 is known, the local tension in the sheet 20 can be easily computed with well-known geometrical techniques by mathematically modeling the deflected sheet portion as a band having a 1 inch width. Using this mathematical model, the sheet tension is computed, as follows:

$$T(i) = \frac{F}{2 \sin \phi'} \quad (3)$$

where

T(i) is the sheet tension in the 1 inch wide slice of the sheet, i, which is deflected through the tension sensor 104;

F is the force applied to the sheet 20 by bellow 62 at the known measured pressure; and $\phi'$ is the angle that the sheet 20 is deflected at pincher 52 or 54 relative to the straight line path between the pinchers.

In operation, all three of the bellows are retracted by applying vacuum through the tubing 102 so that the ambient pressure collapses the bellows. The sheet 20 is then threaded through the tension sensor 104. Hinged sheet guides 86, 88 and 90 assist in directing the sheet 20 between the posts, 48, 50, and bellows, 60, 62 and 64, and also serve to keep the flexible bellows vertical against the lateral force of the moving sheet 20.

After the sheet 20 is threaded through the tension sensor 104, the posterior 64 and anterior 60 bellows are inflated to a pressure of 10 inches of water. At this pressure, with polished sapphire surfaces, 92, 94, 96 and 98, the sheet 20 is securely held to the posts 48, 50, yet allowed to smoothly and easily slide through the pinchers 52, 54 with negligible friction. Once the sheet 20 is secured to the posts, 48, 50 the central bellow 62 is inflated with air to a pressure of about 9.0 inches of water and the sheet deflection is measured with the proximity sensor 100. The local sheet tension can then be computed as described above.

Because the sheet is held securely to the posts, 48, 50, and thus prevented from flopping around, and because the pincher 52 "irons out" any wrinkles in the sheet 20 as it enters the sensor, 104, the bending points of the sheet 20 are known with a high degree of accuracy. Accordingly, the sheet tension can also be computed with a similarly high accuracy.

The tension sensor 104 may also be mounted to the scanning gauge support members 28, 30, as illustrated in FIGS. 3 and 5. Therefore, as the support members 28, 30, and thus the tension sensor heads 46, 58 scan back and forth across the width of the sheet 20 in the cross-direction, as shown by arrow 106, a tension profile can be determined for the sheet 20. In particular, the tension sensor 104 is preferably mounted on the support members 28, 30 in-line, along the machine direction, with the strength sensor 108. In this way, the machine directionally oriented tension exerted on the sheet 20 then passing through the strength sensor 108 is simultaneously measured by the tension sensor 104. This measured local sheet tension may then be used in computing the sheet strength.

For the purpose of analysis, the travelling paper sheet 20 is treated, mathematically, as an anieotropic elastic membrane infinite in lateral extent. The strength sensor wheel 18 distorts a portion of the sheet 20 out of the plane of the ring 12, and as the sheet 20 moves through the strength sensor 108, the ring 12 restores the sheet 20 to its original plane. The sheet 20 is thus momentarily stretched as it passes through the strength sensor 108. As an example, the inside ring 12 diameter may be 3 inches and the outermost wheel diameter may be 6 inches. The wheel may deflect the sheet 3.5 mm below the upper ring surface. However, the dimensions of the wheel 18 and ring 12 are not critical to the operation of the invention. This stretched membrane model can be analyzed using known geometrical techniques to determine how the forces exerted on the 4 ring segments 12A-12D relate to the extensional stiffness, bending resistance and machine directionally oriented tension applied to the sheet by the sheet processing equipment.

As previously mentioned, the outputs from the load cells 16A-16D, coupled to the strength sensor ring segments 12A-12D, are the result of 3 additive factors: (1) the bending resistance of the sheet; (2) stress in the sheet 20 caused by the strain due to local distortion of the sheet 20 by the sensor wheel 18 when it pushes the sheet 20 into the ring 12, (i.e., the sheet extensional stiffness); and (3) the machine-directionally oriented tension applied to the sheet 20 by the papermaking machinery. Utilizing the above mathematical model, the component of force measured by the machine direction load cells 16A and 16C on the ring segments, 12A and 12D, respectively, and caused by the machine direction tension applied to the sheet by the papermaking machine is equal to:

$$F_{MDT}(i) = B_{md} * T(i) * t(i) * \tan(\theta), \quad (4)$$

where:

$F_{MDT}(i)$ is the component of the force measured by both of the machine-direction load cells 16A and 16C, and which is caused by the machine direction tension at cross-directional position i of the sheet;

T(i) is the sheet tension at cross-directional position i applied by the papermaking machine;

t(i) is at the thickness of the sheet passing through the strength sensor at position i;

$\theta$ is the angle formed between the deflected sheet portion immediately adjacent the inside of the sensor ring, and the plane formed by the undeflected sheet outside the ring measured along a radius of the ring; and $B_{md}$, discussed below, is a constant having a value of 149.21 mm.

The mathematical model assumes that the sheet processing machinery does not apply any tension to the sheet in the cross-directions, as is the usual case in practice. Nevertheless, because each of the cross-directional ring segments 12B, 12D, occupies a finite 90° arc of the ring circle, the force of the sheet against these cross-directional rings will be effected by the machine direction tension. Accordingly, the force of the sheet against the cross-directional ring segments 12B, 12C, caused by the machine-direction tension can also be calculated. The measured force component on both of the cross-directional ring segments resulting from the machine direction tension equals:

$$F_{CDT}(i) = B_{CD} * T(i) * t(i) * \tan(\theta), \quad (5)$$

where
$F_{CDT}(i)$ is component of the force measured by both of the cross directional load cells, 16B, 16D, which is caused by the machine direction tension at cross-directional position i of the sheet;

$B_{CD}$ is a constant having a value of 24.72 mm; and the other equation components are the same as defined above for equation (4). The determination of the $B_{CD}$ value is also discussed below.

Sheet thickness at any cross directional position can be measured using well known scanning sheet caliper gauges. Moreover, since the maximum sheet deflection is measured by the deflection sensor, 32, tan ($\theta$) can be geometrically computed to a first approximation by assuming that the deflected sheet assumes a cone shape having an apex value, Z, measured by the deflection sensor 32. Local sheet tension is measured with the sheet tension sensor previously discussed. Thus, the machine direction tension contribution to the force measured by the machine direction and cross-direction load sensors 16A–16D can be calculated from equations (4) and (5).

As will be apparent to those skilled in the art, the value of tan $\theta$ may be more accurately computed from the previously discussed membrane model which shows that the deflected sheet actually has some curvature where it is in contact with the wheel 18 (see FIG. 8) and is, therefore, not a perfect cone. For example, the value of the angle $\theta$ may be computed from the membrane model at any point where the membrane contacts the inside of the ring, using geometrical mathematical calculations known in the art. However, the assumption that the deflected sheet forms a cone produces acceptably accurate results.

The following modified equations are used to accurately compute sheet strength independent of variations in local sheet tension:

$$S_{MD}(i) = A'\left[\frac{(L_a + L_c - F_{MDT})}{(B' + Z)}\right]^{D'} + E'; \tag{6}$$

and $$S_{CD}(i) = F'\left[\frac{(L_b + L_d - F_{CDT})}{(G' + Z)}\right]^{I'} + J'. \tag{7}$$

where $S_{MD}(i)$ and $S_{CD}(i)$ are the machine direction and cross direction tensile strengths, respectively, at cross-directional sheet positions, i.

$L_a$, $L_b$, $L_c$, $L_d$ and Z are the same as discussed above; and

A', B', D', E', F', G', I' and J' are constants. The value of these constants are determined by fitting equations (6) and (7) to laboratory strength test data using known curve fitting techniques.

The strength values computed from equations (6) and (7), above, are independent of changes in sheet tension, whether the tension values in the machine direction are changed due to changes to the force applied to the sheet 20 by the sheet processing equipment or are, instead, due to changes in tension across the width of the sheet 20 due to the sheet characteristics and the previously mentioned edge effect.

To calculate how the machine directionally oriented tension contributes to the strength sensor output, it is assumed that the machine directionally oriented sheet tension inside the ring is the same as the sheet tension outside the ring applied by the sheet processing equipment. The tension contribution to the strength sensor output is then calculated by a purely geometrical analysis. When the spherical section wheel 18 of the strength sensor 108 pushes the sheet 20 into the center of the ring 12, the sheet 20 forms an approximately cone-shaped surface. Using cartesian coordinates with the machine directions as the X axis, the cross directions as the Y axis, and the Z axis normal to the plane of the ring 12, it is assumed that the tension is applied only in the X direction, with no Y or Z components. When the sheet 20 is deformed by the wheel 18, the tension applied by the sheet processing equipment remains unchanged, but with respect to the coordinate system, a Z component of tension is created, the X component is reduced and there remains no Y component. The Z component of tension, which the load cells 16A–16D of the strength sensor ring 12 measure, depends on the distance of the cone wall along the Y axis from the center of the ring. At a distance y from the center of the ring along the Y axis, a section through the cone in the X-Z plane is cut. This conic section forms a parabola. The Z component of the tension where the conic section meets the ring 12 produces a force measured by the strength sensor load cells and which may be described mathematically as:

$$df = T(i) * t(i) * dy * \sin \theta' \tag{8}$$

where $\theta'$ is the angle between the plane of the upper ring surface (or the sheet outside of the ring) and the parabolic section cut in the X-Z plane of the sheet at a distance y from the center of the ring along the Y axis at the point where the parabola touches the ring.

The value of $\sin \theta'$ can be found from the derivative of the equation for the parabola formed by the conical section, thus:

$$z = a*x^2 + b. \tag{9}$$

the derivative of which is:

$$\frac{dz}{dx} = 2a*x = -\sin \theta'. \tag{10}$$

where, from the boundary conditions it can be computed that, $$\text{at } z = 0, a = \frac{-b}{x(\text{ring})^2} = \frac{-b}{R^2 - y^2}; \text{ and} \tag{11}$$

$$\text{at } x = 0, b = z(\min) = \frac{(R - y) * z(\text{at cone apex})}{R}; \tag{12}$$

Where
R = the radius of the sensor ring 12 measured from the center of the ring to the point where the deflected sheet contacts the ring 12, and z(min) is the minimum z value attained by the parabola as a function of y.

The value of $\sin \theta'$ is $-dz/dx$, at $x = x(\text{ring})$, therefore:

$$\sin \theta' = \frac{2 * (R - y) * z(\text{at cone apex})/R}{\sqrt{R^2 - y^2}} \tag{13}$$

The element of force is thus:

$$df = T(i) * t(i) * \frac{\left(2(R-y) * \frac{z(\text{at cone apex})}{R}\right)}{\sqrt{R^2 - y^2}} dy \quad (14)$$

The component of the output of the machine direction load cells 16A, 16C resulting from the machine-directionally oriented sheet tension is the force, df, integrated over the two 90° machine direction ring segments 12A, 12C, as follows:

$$4* \int_0^{R*\sin(\pi/4)} \left(\frac{df}{dy}\right) dy = F_{MDT}(i) = 4* \int_0^{R*\sin(\pi/4)} (T(i)*t(i)*\sin(\theta')*dy \quad (15)$$

$$= 4*T(i)*t(i) \int_0^{R*\sin(\frac{\pi}{4})} 2\left[\frac{(R-y)*z(\text{apex})}{R\sqrt{R^2-y^2}}\right] dy$$

Similarly, for the cross-direction:

$$4* \int_{R*\sin(\frac{\pi}{4})}^R \left(\frac{df}{dy}\right) dy = F_{CDT}(i) = 4* \int_{R*\sin(\frac{\pi}{4})}^R T(i)*t(i)*\sin(\theta')dy \quad (16)$$

$$= 4*T(i)*t(i)2 \int_{R*\sin(\frac{\pi}{4})}^R \left[\frac{(R-y)*z(\text{apex})}{R\sqrt{R^2-y^2}}\right] dy$$

Utilizing equations (4) and (5) above, and the fact that $$\tan\theta = \frac{z(\text{apex})}{R} \text{ yields:}$$

$$B_{md} = 8 \int_0^{R*\sin(\frac{\pi}{4})} \frac{R-y}{\sqrt{R^2-y^2}} dy, \quad (17)$$

and $$B_{cd} = 8 \int_{R*\sin(\frac{\pi}{4})}^R \frac{(R-y)\,dy}{\sqrt{R^2-y^2}} \quad (18)$$

These integrals may be evaluated numerically with the result that $B_{md}$ is equal to 149.21 mm and $B_{cd}$ is equal to 24.72 mm.

As previously mentioned, for small sheet deflections, the tension sensor 104 provides a highly accurate indication of the local machine directionally oriented tension which the sheet processing equipment applies to the sheet 20. However, as the amount of sheet deflection increases, the tension sensor 104 itself stretches the sheet 20 and therefore adds an additional stress or tension component to that applied by the sheet processing equipment. The amount of additional tension induced in the sheet 20 by the deflection of the tension sensor 104 can be determined experimentally by holding a sheet under a known machine directionally oriented tension, deflecting the sheet by different known amounts in the tension sensor and then comparing the known applied sheet tension to that computed from the signals received from the sheet tension pressure transducer 84 and the proximity detector 100. Alternatively, the stress induced in the sheet 20 by deflection in the tension sensor 104 can be computed, as explained above, using the previously discussed mathematical infinite anisotropic membrane model.

From the above discussion, the tension value, T(i), in the above equations can be corrected for error in the tension reading caused by the sheet deflection in the tension sensor. In addition, however, because two different amounts of sheet deflection will stretch the sheet by differing amounts, and therefore induce different amounts of additional stress in the sheet, the wheel and ring strength sensor 108 can itself be used to measure sheet tension. The measured sheet tension can then be used in the previously discussed nondestructive sheet strength calculations. The use of the wheel and ring strength sensor 108 to determine the local machine directionally oriented sheet tensions is advantageous because it eliminates the need for the separate tension sensor 104.

To accomplish the above, the wheel 18 is pivotally mounted to the upper gauge support member 28 at pivot 110. Air cylinder 112 is then used to displace the sheet 20 into the ring 12 by different amounts on alternating scans across the sheet 20. For example, during a first scan across the sheet 20, the air cylinder 112 is extended such that the wheel 18 deflects the sheet into the ring 12 by a relatively small amount, for example, 1.5 mm below the top surface of the ring 12. The force on the machine direction ring segments, 12A, 12C, is measured as the strength sensor scans across the sheet. Using the force readings supplied by the machine direction load cells 16A, 16C, the sheet tension is calculated at each cross directional location across the sheet.

As explained above, since the deflection is relatively slight, the entire force readings from the load cells 16A, 16C can be assumed to result from the machine directionally oriented sheet tension applied by the sheet processing machinery. For a more accurate calculation, however, the exact percentage of the machine direction tension contribution to the load cell signals can be determined using the geometrical calculations discussed above for the infinite anisotropic membrane mathematical model. Alternatively, the proportion of the machine direction tension contribution to the machine direction load cell signals can be determined experimentally utilizing a known deflection, e.g., 1.5 mm, of a sheet which is held under a known tension. In either event, the first scan of the strength sensor 108 will provide the computer with a tension profile for the sheet 20.

At the end of the first scan across the sheet, the air cylinder is extended so that the wheel 18 now deflects the sheet 20 into the ring 12 to a greater extent, for example, 3.5 mm. Therefore, on the return scan across the sheet 20, the strength sensor 108 will substantially stretch the sheet 20 as the sheet 20 passes through the sensor 108 and will therefore induce an additional stress into the sheet 108. On this return scan, force readings are continuously taken from both the machine direction and cross direction load cells, 16A-16D. Because of the greater amount of sheet deflection during this return scan, it is known that a substantial component of the force readings taken during the return scan results from the additional stress induced in the sheet as it is stretched by the wheel 18 and ring 12. As previously mentioned, the proportional amount of additional stress induced in the sheet for any given deflection, for example 3.5mm, may be determined experimentally by utilizing a sheet held under a known tension.

The load readings from the 4 load cells, 16A-16D, taken during the return scan, are fed to the computer and matched with the tension readings from the first scan for each cross directional position of the sensor 108. Utilizing the previously computed sheet tension values from the first scan, and the load cell readings taken during the return scan, the computer can compute the machine direction and cross directional sheet strengths for each cross-directional position of the sheet with equations 6 and 7 above.

The present invention is not limited to computing machine direction and cross direction sheet tensile strengths, but may also be used to compute a wide variety of different types of sheet strengths using the techniques discussed above. For example, in papermaking, the so-called "Mullen" strength is probably one of the most widely used sheet strength values. Conventionally, Mullen strength is determined by clamping a sample of the paper sheet between two circular clamping rings having a specified standard inside diameter, and building up pressure on one side of the sheet (using a rubber diaphragm and liquid pressure) until the paper bursts. The pressure required to burst the sheet is known as the "Mullen" strength. Needless to say, the conventional Mullen strength technique, like the conventional tensile strength techniques require that the sheet be ripped apart. Therefore, these techniques are not readily adaptable, if at all, to on-line sheet strength determination. However, the non-directional Mullen strength is simply a weighted average of the cross directional and machine directional tensile strengths. Accordingly, the present invention can also be used to determine Mullen strength non-destructively utilizing the following equation:

$$S_{MU}(i) = A'' \left[ \frac{(L_a + L_c - F_{MDT})}{(B'' + Z)} \right]^{D''} + F'' \left[ \frac{(L_b + L_d - F_{CDT})}{(G'' + Z)} \right]^{I''} + E'' \quad (19)$$

where
$S_{MU}(i)$ is the "Mullen" strength of the paper sheet at cross-directional location, i;
$A''$, $B''$, $D''$, $E''$, $F''$, $G''$ and $I''$ are constants;
$L_a$, $L_b$, $L_c$ and $L_d$ are values representative of the load signals from the load cells 16A-16D, respectively; and
$F_{MDT}$, $F_{CDT}$ and $Z$ are as previously defined. The values of the constants may be, again, determined using well known curve fitting techniques for fitting the values of $S_{MU}(i)$ to conventional laboratory Mullen strength measurements.

As previously mentioned, the extensional stiffness of the sheet (i.e., the resistance of the sheet to stretching) is linearly related to sheet strength. However, as an alternative, or in addition to determining sheet strength, it is also sometimes desirable to determine the extensional stiffness directly. Extensional stiffness may also be computed by mathematically modeling the sheet using the same infinite anisotropic elastic sheet model discussed previously.

As previously mentioned, the force of the sheet 20 against the sensor ring 12 measured by the load cells 16A-16D is the result of three additive factors: (1) the stress in the sheet 20 caused by the strain due to local distortion of the sheet 20 by the sensor wheel 18 when it pushes the sheet 20 into the ring 12, (i.e., the extensional stiffness); (2) the machine-directionally oriented tension applied to the sheet 20 by the papermaking machinery; and (3) the sheet bending resistance. The force which the sheet applies to the machine direction ring segments, 12A and 12C, (as measured by the corresponding machine-direction load cells, 16A and 16C) at each cross-directional position, i, across the width of the sheet, may be stated mathematically as:

$$\begin{aligned}\text{OUTPUT}_{md}(i) = \ & A_{md} * E_{md}(i) * t(i) * L(Z(i)) && \text{(strain terms)} \\ + \ & B_{md} * T(i) * t(i) * \tan(\theta) && \text{(tension terms)} \\ + \ & C_{md} * \theta && \text{(bending terms)}\end{aligned} \quad (20)$$

Where:
OUTPUT$_{md}$(i) = the force of the sheet against the machine direction ring segments, 12A and 12C, measured by the load cells, 16A and 16C, at each cross-directional position, i,
t(i) = the caliper of the sheet at each cross-directional position, i,
$E_{md}(i)$ = Young's modulus of the sheet in the machine direction at cross-directional position, i,
L(z(i)) = a function relating the extensional stiffness of the sheet (i.e., $E_{md}(i) \times t(i)$) to stress in the sheet caused by sheet strain as the sensor wheel pushes the sheet into the ring a distance z at each cross-directional position, i,
z(i) = the distance that the wheel pushes the sheet into the center of the ring at each cross-directional position, i,
T(i) = the sheet tension at each cross-directional position, i,
$\theta$ = the angle between the deflected sheet at the inside lip of the segmented sensor ring and the plane formed by the undeflected sheet outside of the ring, measured along the radius of the ring at each cross-directional position, i, and
$A_{md}$, $B_{md}$ and $C_{md}$ = proportionality constants.

The first line of equation (20) represents the force component measured by load cells 16A and 16C resulting from the strain of the sheet induced by the wheel 18 deflecting the sheet 20 into the ring 12. The second line of equation (20) represents the force component resulting from the tension applied to the sheet by the sheet processing machinery. This component has been thoroughly discussed above in connection with equation (4). The third line of equation (20) represents the force component resulting from the bending of the sheet 20 by the wheel 18 into the center of the ring 12. This bending term has also been previously discussed above. This bending term simply states that the force component resulting from deflecting or bending of the sheet into the ring center is directly proportional to the amount of sheet deflection.

An equation similar to equation (20) above exists for the cross-directional output of the sensor ring 12, as follows:

$$\begin{aligned}OUTPUT_{cd}(i) &= A_{cd}*E_{cd}(i)*t(i)*L(z(i)) &\text{(strain terms)}\\ &+ B_{cd}*T(i)*r(i)*\tan(\theta) &\text{(tension terms)}\\ &+ C_{cd}*\theta &\text{(bending terms)}\end{aligned} \quad (21)$$

Where:
$OUTPUT_{cd}(i)$ = the force of the sheet against the cross-direction ring segments, 12B and 12D, measured by the loads cells, 16B and 16D, at each cross-directional position, i,
$E_{cd}(i)$ = Young's modulus of the sheet in the cross-direction at cross-directional position, i,
$A_{cd}$, $B_{cd}$ and $C_{cd}$ = proportionality constants, and the remaining terms are as previously defined.

As suggested below, the Young's modulus E(i) for many sheet materials (e.g., paper) is anisotropic. That is, the value of Young's modulus is, in general, different in the machine direction as compared to the cross-direction. Therefore, the extensional stiffness (Young's modulus times sheet thickness) of such a sheet will also be anisotropic. The degree of anisotropy is called the "squareness".

To calculate the extensional stiffness of the sheet in the machine and cross-directions from the strength sensor outputs, the values of the coefficients $A_{md}$, $B_{md}$, $C_{md}$, $A_{cd}$, $B_{cd}$ and $C_{cd}$ and the function L(z) must be determined.

Figure 7:
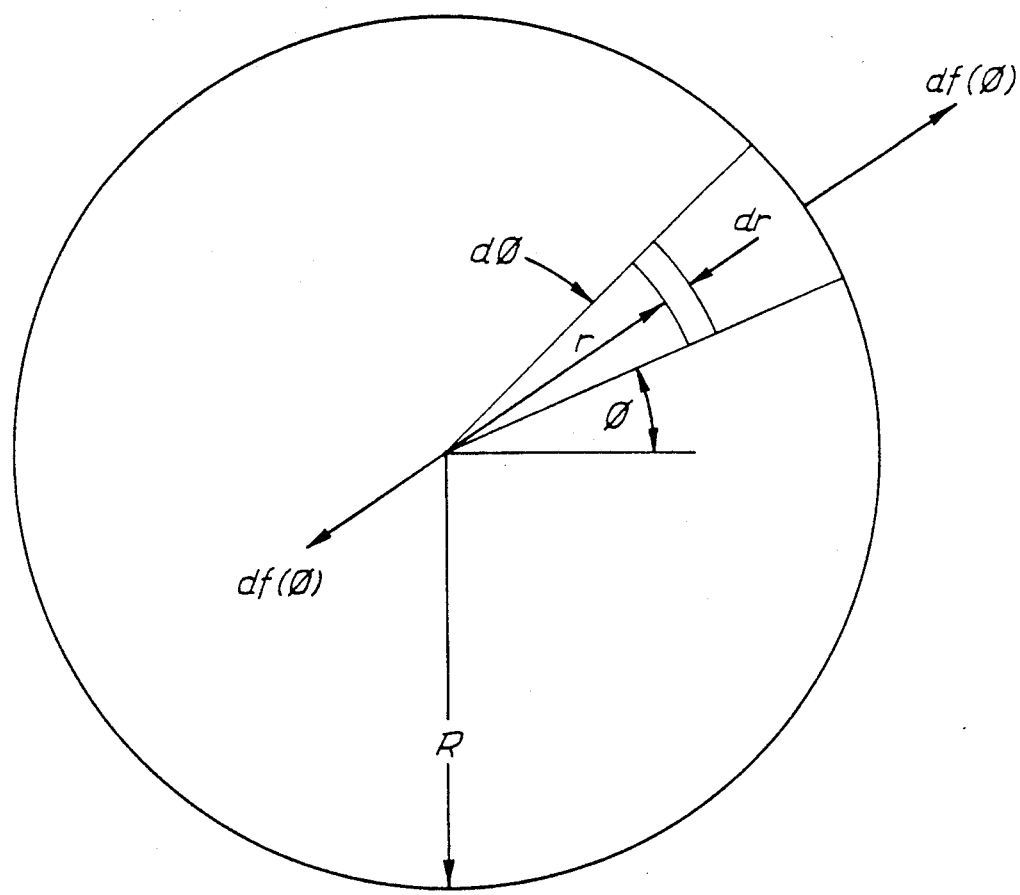
FIG. 7 is a diagrammatic view of the stress and strain experienced by the portion of the sheet supported by the sheet support ring of the strength sensor.

FIG. 7 illustrates the circular portion of the sheet 20 supported within the segmented ring 12. Referring to FIG. 7, consider an infinitesimal wedge of the sheet of an angle d $\theta$ and radius r. The stress distribution in the wedge, caused by an infinitesimal force df($\theta$) applied in the radial direction at the center of the ring and an opposite restraining force applied at radius R, can be determined. The force at any radius, r, along the wedge is related to the stretch or "strain" of the sheet by the equation:

$$df(\phi) = E(\phi)*t*r*d\phi*(ds(r,\phi)/dr) \quad (22)$$

where:
$d\phi$ = the infinitesimal angle of the wedge,
dr = an increment of radius r,
df($\phi$) = the increment of force applied in the radial direction,
ds(r,$\phi$) = the strain induced in element dr by force df($\phi$),
$\phi$ is an angle, measured in the plane defined by the undeflected sheet, from a line oriented in the machine direction,
E($\phi$) = Young's modulus of the sheet as a function of $\phi$,
t = the thickness of the sheet.

Equation (22) gives the force, df($\phi$), required to produce a strain in the sheet, ds, at point r, $\phi$, on the sheet. By rearranging the elements of equation (22), the strain caused by an applied force is then:

$$ds(r,\phi)/dr = (df(\phi)/d(\phi))/(E(\phi)*t*r) \quad (23)$$

The geometry of the strength sensor places boundary conditions on equation (23). Referring to FIG. 8, the wheel 18 deflects the sheet 20 a distance z below the plane defined by the sheet immediately outside of the ring 12. Also, because the contact area between the wheel 18 and sheet 20 is finite, the wheel 18 also defines a minimum radius wherein the deflecting force of the wheel 18 is applied to the sheet 20. Moreover, the ring 12 defines a discontinuity which forces the deflected sheet 20 back into the original plane of the sheet 20 at the ring radius, R. Therefore, in mathematical terms:

at $r = r_{min}$ then $z(r) = z(wheel)$; and at $r = R$ then $z(r) = 0$, where,
z(wheel) = the distance between the plane defined by the undeflected sheet 20 outside of the ring 12 and the edge of the wheel 18 where the paper sheet 20 diverges from the wheel 18, and
$r_{min}$ = the radial distance from the center of the ring 12 to the point where the sheet diverges from the wheel 18.

The boundary conditions above can be expressed as a boundary condition integral, as follows:

$$z(wheel) = \int_{r_{min}}^{R} (dz(r)/dr)*dr \quad (24)$$

where:
z(r) = the displacement of the sheet beneath the plane of the undeflected sheet at radial position r,
dz(r)/dr = the slope of the sheet at radius r.

From the geometry of the sheet, illustrated in the cross-section in FIG. 8, it is seen that the slope of the sheet at any position, r, can be defined mathematically as:

$$dz(r)/dr = \sqrt{(dr + ds)^2 - dr^2}/dr \quad (25)$$

By substituting equation (23) into (25) and equation (25) into equation (24), the boundary condition integral of equation (24) yields a function, A(z), such that:

$$df(\phi)/d\phi = A(Z)*E(\phi)*t, \quad (26)$$

wherein A(z) is a function whose value may be determined numerically for any particular strength sensor having a known ring diameter and known deflection wheel circumference. The function A(Z) is representative of the stress in the deflected sheet portion within the ring 12 for any particular sheet deflection, Z.

As discussed above, and as apparent from the geometry of the strength sensor 108, the load cells, 16A–16D, measure only the component of df($\phi$)/d($\phi$) which is in the direction normal to the plane defined by the undeflected sheet outside of the ring 12. From FIG. 8, it can be seen that this force component is:

$$(df(\phi)/d\phi)_{normal} = (df(\phi)/d\phi)*\sin\phi = (df(\phi)/d(\phi)) *dz/(dr+ds). \quad (27)$$

Therefore, by combining equations 23, 25 and 26 into equation 27, function L(Z) is determined, as follows:

$$(df(\phi)/d\phi)normal = E(\phi)*t*L(Z), \quad (28)$$

Where $$L(Z) = A(Z)*\sqrt{(2*A(Z)/R + (A(Z)/R)^2)} /(1 + A(Z)/R). \quad (29)$$

The function L(Z) relates the force, which the sheet 20 applies to the sensor ring 20 in the direction normal to the plane defined by the undeflected sheet, to the extensional stiffness of the sheet in direction $\phi$.

It is noted that the term L(Z(i)) appears in both equations (20) and (21). Moreover, all of the terms in the tension and bending lines of equations (20) and (21) have been calculated or defined above. Therefore, one need only determine $A_{md}$ and $A_{cd}$ to relate OUTPUT $_{md}$(i) and OUTPUT $_{cd}$(i) to the extensional stiffness of the sheet in the machine direction ($E_{md}$(i)*t(i)) and the extensional stiffness in the cross-direction ($E_{cd}$(i)*t(i)).

Each sensor ring segment measures the force of the sheet over 90° of the ring circle. In radial measure, 90° equals pi/2 radians. The outputs from the load sensors, 16A and 16C, measuring the force against the machine direction ring segments, 12A and 12C, are added together. Similarly, the output from the load sensors, 16B and 16D, measuring the sheet force against the cross-directionally oriented ring segments, 12B and 12D, are added together. These sensor outputs are a function of the angular dependence or squareness of the sheet's extensional stiffness. The function E($\phi$) may be defined by the equation of an ellipse, as follows:

$$E(\phi) = E_{md}*E_{cd}/\sqrt{(E_{md}*\cos(\phi))^2 + (E_{cd}*\sin(\phi))^2}, \quad (30)$$

where
$E_{md} = E(0)$ and
$E_{cd} = E(pi/2)$.

The combination of equations (28) and (30), yields:

$$\text{STRAIN OUTPUT}_{md} = 4*\int_0^{+\pi/4} E(\phi)*t*L(Z)*d\phi = \quad (31)$$

$$A_{md}*E_{md}*t*L(z);$$

and $$\text{STRAIN OUTPUT}_{cd} = 4*\int_{+\pi/4}^{+\pi/2} E(\phi)*t*L(z)*d\phi = \quad (32)$$

$$A_{cd}*E_{cd}*t*L(z),$$

where
STRAIN OUTPUT$_{md}$ = the component of the force of the sheet pressing against ring segments 12A and 12C measured by load cells, 16A and 16C, which results from the strain induced in the sheet 20 by the deflection of the wheel 18, and
STRAIN OUTPUT$_{cd}$ = the component of the force of the sheet pressing against ring segments 12B and 12D measured by load sensors, 16B and 16D, which results from the strain induced in the sheet 20 by the deflection of the wheel 18.

From the combination of equations (30) and (31):

$$A_{md} = \quad (33)$$

$$4*\left(\int_0^{+\pi/4} E_{md}*E_{cd}/\sqrt{(E_{md}*\cos(\phi))^2 + (E_{cd}*\sin(\phi))^2}\, d\phi\right)$$

Similarly, from the combination of equations (30) and (32), $$A_{cd} = \quad (34)$$

$$4*\left(\int_{\pi/4}^{+\pi/2} E_{md}*E_{cd}/\sqrt{(E_{md}*\cos(\phi))^2 + (E_{cd}*\sin(\phi))^2}\, d\phi\right)$$

The elliptic integrals of equation (33) and (34) give the coefficients $A_{md}$ and $A_{cd}$, and are solved numerically.

The values of $E_{md}$ and $E_{cd}$ do not need to be determined since the integrals of equations (33) and (34) depend only on the squareness of the Young's modulus of the sheet. That is, the values of these integrals depend only on the ratio $E_{md}/E_{cd}$, not on the absolute values of $E_{md}$ and $E_{cd}$. Table I below shows the values of the coefficients $A_{md}$ and $A_{cd}$ for various values of squareness, $E_{md}/E_{cd}$.

TABLE I

| $E_{md}/E_{cd}$ | COEFFICIENTS | |
|---|---|---|
| | Amd | Acd |
| 1.00 | 3.142 | 3.142 |
| 1.11 | 3.080 | 3.196 |
| 1.25 | 3.000 | 3.252 |
| 1.43 | 2.900 | 3.308 |
| 1.67 | 2.772 | 3.360 |
| 2.00 | 2.621 | 3.400 |
| 2.50 | 2.396 | 3.452 |
| 3.33 | 2.108 | 3.480 |
| 5.00 | 1.712 | 3.500 |
| 10.00 | 1.128 | 3.520 |

As explained in detail above, the tension terms of equations (20) and (21) can be computed, while the bending terms for any given deflection can be determined experimentally using an unrestrained sheet. Accordingly, since the sheet tension, T(i), and sheet thickness, t(i), at any cross-directional position, i, is the same for equations (20) and (21), the squareness ratio $E_{md}/E_{cd}$ is uniquely determined by the ratio of load sensor outputs $(L_a+L_c)/(L_b+L_d)$. Accordingly, the integrals of equations (33) and (34) can be computed.

Using the above mathematical analysis, all of the terms of equations (20) and (21) can be computed or measured. Therefore, equations (20) and (21) can be rearranged to determine extensional stiffness, in the machine direction and cross direction, as follows:

$$E_{md}(i)*t(i) = \frac{\text{OUTPUT}_{md}(i)}{A_{md}*L(Z(i))} \quad (35)$$

$$E_{cd}(i)*t(i) = \frac{\text{OUTPUT}_{cd}(i)}{A_{cd}*L(Z(i))} \quad (36)$$

p Where OUTPUT$_{md}$(i) is simply $L_a+L_c$ and OUTPUT$_{cd}$(i) is simply $L_b+L_d$ for each cross-directional sheet location, i.

Also, the Young's modulus of the sheet 20 may be determined in the machine and cross-directions simply by dividing equations (35) and (36) by the measured thickness, t(i), of the sheet at each cross-directional sheet location, i.

In summary, a sheet strength sensor and sheet tension sensor of the types disclosed above can be mounted to a scanning station on a papermaking machine. The output signals from the load cells of the strength sensor, the output signals of the sheet tension sensor, and the output signals of a sheet caliper device can then be transmitted to the system process control computer. The computer is programmed to periodically perform the mathematical computations described above at each cross-directional position, i, across the sheet as the gauge heads scan back and forth across the cross-direction of the sheet. At each cross-directional position, i, the computer can then provide an output signal indicative of the sheet strength, extensional stiffness, or Young's modulus of the sheet for the machine and cross-directional sheet orientations.

As previously stated, the sheet strength can be modeled mathematically as a linear function of the extensional stiffness, therefore, for example:

$$E_{md}(i)*t(i) = KS_{md}(i) + c \quad (37)$$

and $$E_{cd}(i)*t(i) = K'S_{cd}(i) + c'. \quad (38)$$

Wherein K, K', c and c' are constants whose values may be determined by fitting equations (37) and (38) to conventional laboratory tensile strength data using conventional curve fitting techniques.

If the system process control computer for the papermaking machine is programmed with a desired sheet strength (or extensional stiffness), then the computer can monitor the strength values computed for the sheet and adjust the sheet manufacturing parameters to ensure that the sheet strength (or extensional stiffness) of the manufactured sheet meets the desired strength (or stiffness) specifications. For example, in a modern papermill, many sheet manufacturing process steps are conducted under computer control. Therefore, if, for example, the computer determines that the sheet is not sufficiently strong, then the computer can instruct the headbox slice lip to increase the flow of paper pulp slurry onto the wire, or the pulp refining process can be adjusted in ways that are well known in the art to increase the sheet strength. Alternatively, the computer could decrease the sheet strength by, for example, decreasing the flow of paper pulp slurry from the headbox onto the wire. There are numerous other papermaking process parameters known in the art which may likewise be adjusted under computer control to increase or decrease sheet strength (or extensional stiffness).

Two preferred embodiments of the inventive sheet tension sensor have been described. Certain sheet strength equations and equations for determining the extensional stiffness of a sheet in the machine and cross-directions have also been disclosed. Nevertheless, it is understood that one may make various modifications to the disclosed tension sensor embodiments without departing from the spirit and scope of the invention. For example, it is not absolutely necessary that bellows be used to hold the sheet at precisely known locations. Other sheet pinching devices could be used. Similarly, the electro-magnetic proximity device described above is not the only device which could be used to determine the deflection of the sheet. Other position measuring devices could be used. Moreover, the invention is not limited to use with paper sheet but may also be used with other sheet materials. Furthermore, the illustrated sheet strength/extensional stiffness sensor would operate equally well in other orientations, or by utilizing equations other than those specifically disclosed. Thus, the invention is not limited to the preferred embodiments described herein, but may be altered in a variety of ways which will be apparent to persons skilled in the art.

We claim:

1. A sheet tension sensor, comprising:
   first pincher means defining a first channel for guiding therethrough the movement of a travelling sheet in sliding contact with opposite surfaces of the first channel;
   second pincher means defining a second channel for guiding therethrough the movement of the travelling sheet, wherein the second channel is spaced from the first channel;
   deflecting means for forcibly deflecting the movement of the sheet between the first and second channels;
   deflection measuring means for providing a deflection signal indicative of the distance the sheet is deflected by the deflecting means; and
   force means for providing a force signal indicative of the deflecting force exerted by the deflecting means on the sheet.

2. The sheet tension sensor of claim 1, further comprising a computer operatively coupled to the deflection measuring means and the force means for receiving the deflection and force signals and for computing sheet tension based upon said signals.

3. The sheet tension sensor of claim 1, wherein the first and the second pincher means each include:
   (i) a first abrasion resistant sheet contacting surface having a fixed position relative to the deflection measuring means, the first surface being adapted for pressurized sliding contact with one side of the sheet; and
   (ii) a bellow having a second abrasion resistant sheet contacting surface adapted for pressurized sliding contact with the opposite side of the sheet, said second surface being movable toward and away from the first surface with expansion and contraction, respectively, of the bellow,
   wherein the first and second surfaces form the opposite surfaces of the channels.

4. The sheet tension sensor of claim 1, further comprising means for scanning the deflecting means back and forth across the width of the sheet.

5. The sheet tension sensor of claim 1, wherein the second pincher means is for placing the travelling sheet in sliding contact with opposite surfaces of the second channel.

6. A sheet tension sensor for determining the tension of a moving sheet, comprising:
   a first pair of opposing surfaces adapted for pressurized sliding contact with opposite sides of the moving sheet;
   a second pair of opposing surfaces adapted for contact with the opposite sides of the moving sheet, wherein the second pair of surfaces are spaced from the first pair of surfaces;
   a sheet deflection member disposed between the first and second pairs of opposing surfaces to forcibly deflect the sheet as the sheet moves between the first and second pairs of opposing surfaces; and a deflection sensor adapted to generate a deflection signal indicative of the amount of sheet deflection induced in the sheet by the member.

7. The sheet tension sensor of claim 6, further comprising a force sensor adapted to generate a force signal indicative of the force exerted by the deflection member against the sheet.

8. The sheet tension sensor of claim 7, further comprising means for scanning the sheet deflection member back and forth across the width of the sheet.

9. The sheet tension sensor of claim 8, further comprising a computer, operatively coupled to the deflection sensor and the force sensor, for receiving the deflection signal and the force signal and computing sheet tension at a plurality of locations across the width of the sheet based upon these signals.

10. The sheet tension sensor of claim 6, further comprising means for scanning the sheet deflection member back and forth across the width of the sheet.

11. A sheet tension sensor for determining the tension of a moving sheet, comprising:

a first pair of opposing surfaces adapted for pressurized sliding contact with opposite sides of the moving sheet;

a second pair of opposing surfaces adapted for contact with the opposite sides of the moving sheet, wherein the second pair of surfaces are spaced from the first pair of surfaces;

a sheet deflection member disposed between the first and second pairs of opposing surfaces to forcibly deflect the sheet as the sheet moves between the first and second pairs of opposing surfaces; and a force sensor adapted to generate a force signal indicative of the force exerted by the deflection member against the sheet.

12. The sheet tension sensor of claim 11, further comprising means for scanning the sheet deflection member back and forth across the width of the sheet.

13. A process for measuring the tension in a moving sheet, comprising the steps of:

at a first location, moving the sheet between two surfaces in sliding contact with opposite sides of the sheet;

deflecting a portion of the sheet at a location which is spaced from the first location in the direction of sheet movement; and determining sheet tension based upon the amount of deflection and the magnitude of the deflecting force.

14. The process of claim 13, further comprising the steps of deflecting multiple portions of the sheet at different locations across the width of the sheet and determining the sheet tension at each location.

15. A scanning sheet tension sensor, comprising:

a first pair of opposing surfaces disposed for contact with opposite sides of a sheet;

a second pair of opposing surfaces disposed for contact with the opposite sides of the sheet, wherein the second pair of surfaces is spaced from the first pair of surfaces;

a sheet deflection member disposed between the first and second pairs of opposing surfaces for forcibly deflecting the sheet;

a deflection sensor adapted to generate a deflection signal indicative of the amount of sheet deflection induced in the sheet by the member;

a force sensor adapted to generate a force signal indicative of the force exerted by the deflection member on the sheet; and scanning means for scanning the sheet deflection member and the first and second pairs of opposing surfaces back and forth across the width of the sheet.

* * * * *